(12) United States Patent
Mark et al.

(10) Patent No.: US 6,771,759 B2
(45) Date of Patent: Aug. 3, 2004

(54) METHOD AND APPARATUS FOR MANAGING PARTIES TO A MULTIPOINT CONFERENCE USING DIGITAL TECHNIQUES

(75) Inventors: Jeffrey Mark, Santa Barbara, CA (US); Kalon Kelley, Santa Barbara, CA (US); Mark Grosen, Goleta, CA (US)

(73) Assignee: Intel Corporation, Santa Clara, CA (US)

( * ) Notice: Subject to any disclaimer, the term of this patent is extended or adjusted under 35 U.S.C. 154(b) by 532 days.

(21) Appl. No.: 09/799,912

(22) Filed: Mar. 5, 2001

(65) Prior Publication Data

US 2001/0053212 A1 Dec. 20, 2001

Related U.S. Application Data

(63) Continuation-in-part of application No. 09/527,947, filed on Mar. 8, 2000.
(60) Provisional application No. 60/186,943, filed on Mar. 4, 2000.

(51) Int. Cl.[7] .............................................. H04M 3/42
(52) U.S. Cl. ............................ 379/202.01; 379/93.21; 379/204.01
(58) Field of Search ........................ 379/88.17, 93.21, 379/158, 202.01, 203.01, 204.01, 205.01, 900

(56) References Cited

U.S. PATENT DOCUMENTS

| | | | | |
|---|---|---|---|---|
| 5,034,947 A | * | 7/1991 | Epps .......................... | 370/268 |
| 5,483,588 A | * | 1/1996 | Eaton et al. ............ | 379/202.01 |
| 5,689,553 A | * | 11/1997 | Ahuja et al. ............ | 379/202.01 |
| 6,175,619 B1 | * | 1/2001 | DeSimone ............. | 379/202.01 |
| 6,178,237 B1 | * | 1/2001 | Horn ...................... | 379/202.01 |
| 6,404,873 B1 | * | 6/2002 | Beyda et al. .......... | 379/202.01 |
| 6,418,214 B1 | * | 7/2002 | Smythe et al. ......... | 379/202.01 |
| 6,628,767 B1 | * | 9/2003 | Wellner et al. ........ | 379/202.01 |

* cited by examiner

*Primary Examiner*—Bing Bui
(74) *Attorney, Agent, or Firm*—Blakely, Sokoloff, Taylor & Zafman LLP

(57) ABSTRACT

An improved technique of managing a multiparty conference of a digital domain such as the Internet is disclosed. A party may invite other party(ies) to split the conference into two conferences. Parties invited establish communications with all other invited parties to create the second conference. Also, an improved technique for preventing collisions of messages in a multiparty conference of a digital domain such as the Internet is disclosed. A deference algorithm is provided that prioritizes messages.

12 Claims, 2 Drawing Sheets

METHOD AND APPARATUS FOR MANAGING PARTIES TO A MULTIPOINT CONFERENCE USING DIGITAL TECHNIQUES

RELATED APPLICATION

This application is a continuation-in-part of non-provisional application No. 09/527,947, filed Mar. 8, 2000, which claims priority to provisional application No. 60/186,943, filed Mar. 4, 2000.

TECHNICAL FIELD

This invention relates to multiparty conferences, and more particularly, to multiparty audio, video, or other types of conferences implemented over a data network using digital techniques.

BACKGROUND OF THE INVENTION

Call conferencing is an old technology utilized to facilitate communications among a plurality of conference members. Such technology is conventionally utilized for audio communications over standard telephones. More recently, conferencing technology has also been utilized for video signals. A conventional conferencing system operates by patching together multiple parties via a conference bridge. A conference bridge operates by transmitting to each conference member a signal that represents the sum of all of the other conference members' inputs. Thus, each member hears all the audio generated by the other members.

Conventional analog conferencing systems do not provide flexibility and ease of use for conference members. Specifically, there is no easy way for controlling which conference members receive any one or more particular signals. Rather, each conference member receives the sum of signals produced by all other conference members.

Another problem with conferences based upon conventional telephony is that the bandwidth utilized to transmit audio over a conventional telephony system includes a large amount of waste. This is because a circuit connection exists from each conference member to all other conference members. Much of the bandwidth of the circuit connection is idle a large amount of time.

The modern trend is to convey more and more audio and video traffic over data networks such as the Internet. This trend is applicable to conferencing systems as well. Use of the Internet maximizes the efficiency of the network because packets related to multiple different communications sessions can be conveyed over the same physical media. Thus, Internet based audio/video conferencing systems have emerged recently.

The use of digital techniques to implement conference calls allows a variety enhanced services to be implemented, and eliminates waste of bandwidth. Moreover, the conference bridge itself may be eliminated since conferencing is implemented by forwarding separate copies of a packet from an originating entity to multiple receiving entities. At the same time, digital conferencing techniques present their own problems. Digital conferences cannot be implemented by simply summing all of the inputs to create a signal for each particular conference member. Rather, the packets of data must be assembled, ordered properly and then conveyed appropriately. Additionally, the use of digital techniques provides that conferences may be divided into multiple conferences and reassembled, merged with other conferences, etc. All of this must be managed. In particular, messages of a conference must be managed to prevent collision.

A document dated Jun. 17, 1999, generated by the Internet Engineering Task Force describes basic techniques of arranging conferences over the Internet using digital techniques. The described technique solves some of the foregoing problems. The technique described therein is lacking in several aspects. In arranging for a conference, it uses a flooding technique wherein each member of the conference advises a member seeking to join the conference if members previously in the conference drop out. This flooding technique results in added overhead. Additionally, if a member attempting to join the conference is locked out by a present member of the conference, there is no easy technique for overriding such lockout. There are a variety of other cumbersome techniques used in the referenced system.

There exists no known technique for efficiently monitoring and managing conferences as they are set up, merged, split, and destroyed. There exists no known technique of efficiently adding members to an Internet based audio or video conference. In addition, there exists no known technique for efficiently preventing collisions between conference messages. Accordingly, there exists a need in the art for an improved technique of managing distributed multipoint conferences using the Internet and/or other similar data networks.

SUMMARY OF THE INVENTION

The above and other problems of the prior art are overcome in accordance with the present invention which relates to a technique of monitoring and controlling various aspects of conferences. In accordance with the present invention, a conference is set up by an "inviting" member inviting others to join the conference. The invitation specifies which, if any, other members are presently in the conference and thus, the "joining" member knows with which other conference members to communicate. Importantly, if the invitation contains the identification of members that later drop out of the conference, those members are nonetheless contacted by the joining member as if they were in the conference. Those other members that have previously dropped out would then advise the joining member that they are no longer in the conference. The use of the original information in the invitation to specify conference members, rather than having the conference membership information updated each time the joining member contacts one of the specified conference members and that specified member indicates that some other member has dropped out of the conference, eliminates additional management and processing overhead when compared with prior systems.

In another embodiment, a joining member may be denied permission to join by any of the conference members. The particular member denying such admission may have its identity broadcast to the other members by the member attempting to join the conference. Other members may agree or disagree with the decision, and determine whether or not to override such decision to reject the joining member. Alternatively, the remaining conference members, if they want the joining member to join, may cut off the member rejecting the joining party from the conference.

In another embodiment, after a joining member is invited to join the conference by the inviting member, the joining member seeks and receives permission from each of the other conference members. As each conference member responds by granting or denying permission, the inviting party is kept apprised of the status.

In another embodiment, a conference member may invite other conference members to split the conference into two conferences. Invited members communicate with one another to establish the second conference.

In yet another embodiment, a technique for preventing collision of messages in a conference using a deference algorithm is used. The deference algorithm prioritizes messages to prevent collision.

The above and other objects of the invention will become clearer with reference to the following description of the preferred embodiment and the accompanying drawings.

DETAILED DESCRIPTION OF THE PREFERRED EMBODIMENT

Figure 1:
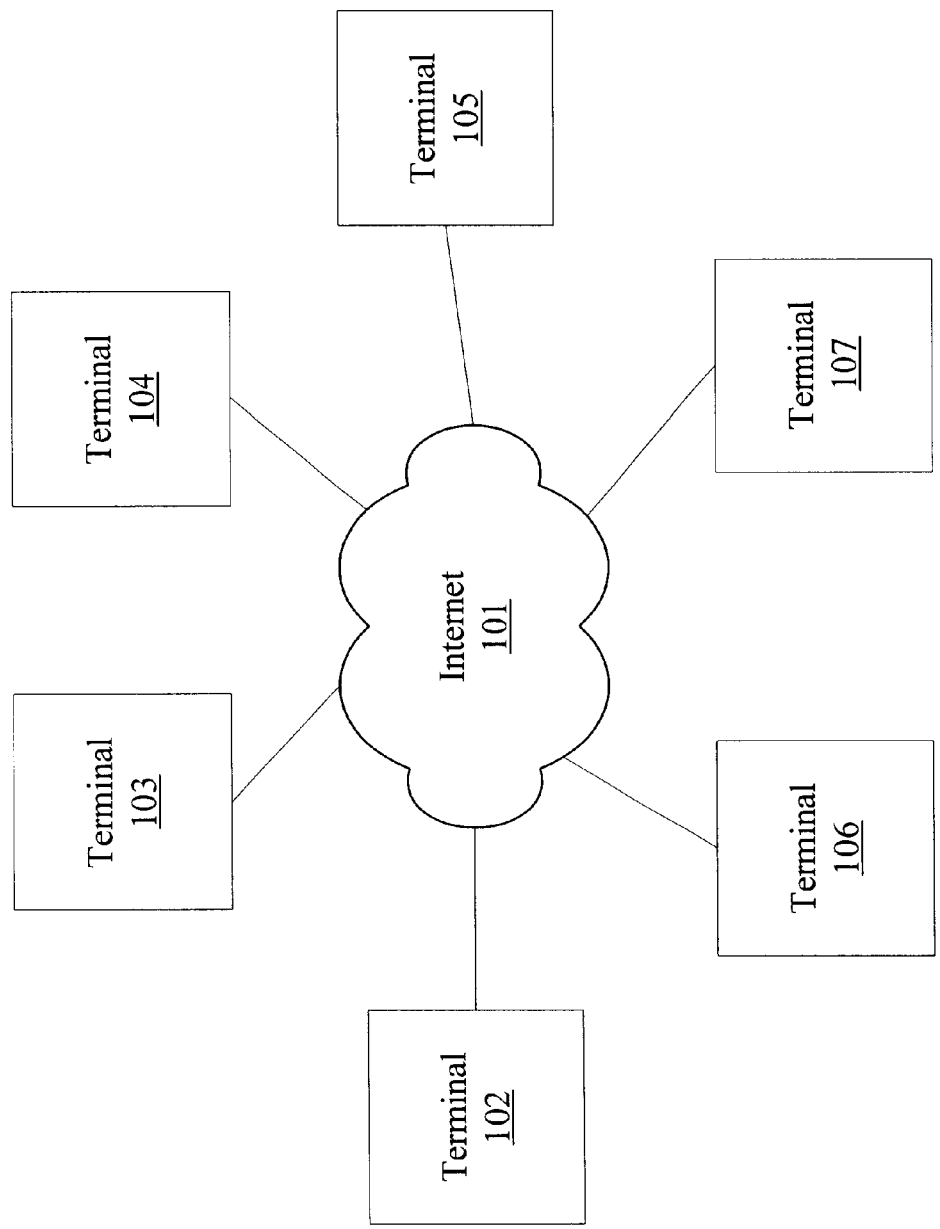
FIG. 1 is a high level conceptual diagram of a plurality of terminals in communication with each other over the Internet.

FIG. 1 shows a high level conceptual diagram of a portion of the Internet 101 connected to six exemplary terminals 102–107. The particular type of hardware and software resident at the terminals 102–107 may vary greatly and is not critical to the present invention. The only requirement for such terminals 102–107 is that they be capable of audio and/or video communications in the conference, and that they implement the appropriate protocols as further described below. It is also noted that while use of the Internet is the preferred embodiment, other networks are possible.

Adding Party

For purposes of explanation, we presume that a conference is ongoing among members 102, 103 and 104. During such conference, it is desired to add member 105 to the conference. Conference member 104 decides to initiate the addition of joining member 105 to the conference. Conference member 104 is denoted herein the inviting member.

Unlike conventional telephony conferences described with respect to the prior art, conferences implemented over the packet switching Internet need not include a conferencing bridge for summing all of the signals from the conference members. Instead, each member of the conference simply sends the packets to all other conference members, and multiple copies of the packets from any conference member are transmitted with different destination addresses. Alternatively, a multicast system may be used, wherein a single packet is sent but recognized as destined for multiple recipients.

An inviting member of the present conference 104 decides to invite joining member 105 to join the conference. An invite message is sent from member 104 to joining member 105, which indicates that members 102 and 103 are also members in the conference. Member 105 then sends "triggered invites" to conference members 102 and 103, indicating that conference member 104 has requested that joining member 105 join the conference. Members 102 and 103 may then grant or deny permission via a consent/denial message. Conference member 104 has indicated its consent via issuance of the invite message.

In establishing a signal relationship between member 105 and members 102 and 103, situations may arise wherein members 102 and 103 are no longer part of the conference. Specifically, members 102 and/or 103 may have dropped out of the conference after the time that member 104 sent the invite message to joining member 105, but prior to joining member 105 joining the conference. Hence, the invite message would include the IDs of conference members that, by the time contacted by the joining member, are no longer members of the conference.

Importantly, the techniques of the present invention do not provide for any of the members 102 or 103 to provide information to joining member 105 indicative of whether the membership in the conference with respect to other members has changed at all. Instead, joining member 105 contacts all of the conference members specified in the original invite message from inviting member 104. If any of those specified members have dropped out of the conference, they simply advise joining member 105 that they are no longer a party to that conference. If however, when conference member 102 is contacted, conference member 102 is already aware that member 103 has dropped out of the conference, that information is not conveyed from conference member 102 to conference member 104. Instead, member 103 would advise joining member 104 of member 103's own status when member 104 attempts to establish communications with conference member 103. This technique minimizes processing at joining member 105.

If new members join during the joining process, it is possible that a conference member 103 may reflect new conference members not specified in the original invite message. Should this occur, the information would be conveyed to the joining member 105. In general, if a joining member contacts a current conference member, that conference member has a record of the present membership in the conference. The contacted conference member may show additional members that are not shown in the original invite message. Information regarding such additional members would be sent to the joining member, so that the joining member may also contact these additional members. On the other hand, the contacted member may have information indicating that members specified in the invite message have since dropped out of the conference. That additional information is not sent to the joining member. Instead, the joining member is left to contact those members which have since dropped out of the conference, and the joining member will be advised of the status by the member that have dropped out of the conference.

In most cases, the conference members specified in the original invite message will, in fact be the same conference members contacted by joining member 105. However, to the extent that the state of membership of the conference is different from that specified, less overhead is incurred by simply allowing the joining member to contact all specified members from the invite message, even if some of those contacts are unnecessary because the members being contacted have dropped out of the conference. This arrangement results in less overhead than advising the joining member each time it contacts a present conference member regarding which other members have since dropped out. If a member that has dropped out of the conference and is contacted by a joining member, the member that has dropped out of the conference would simply send back a message indicating that it is no longer a party to such conference.

With respect to members that remain parties to the conference, those members would reply to a request from member 105 to join the conference. The reply could consist of an admission to the conference or a denial. Once joining member 105 receives admissions to the conference from all conference members specified in the original invite message, as well as those that joined after the invite message was sent, saving those that have since dropped out of the conference, member 105 is considered a conference member.

A joining member 105 may be rejected by any of the conference members. The technique of the present invention provides that if a conference member rejects a joining member, a message is sent to at least the inviting member which indicates the particular member rejecting such joining member. Thus, if conference member 102 denied joining member 105 permission to join the conference, then a message would be sent from joining member 105 to conference member 104 indicating that contrary to the request of inviting member 104, joining member 105 may not join the conference because he has been denied access by conference member 102. This feedback to the inviting member permits the inviting member 104 to seek additional explanation from the rejecting member 102 (even within the media stream of the conference itself), as to why such access is being denied. Additionally, inviting member 104 may have the option to disconnect member 102 from the conference, to thereby facilitate removal of the party denying access to joining member 105.

Moreover, other conference members may be advised of the identity of the rejecting member as well. Such other conference members may be given a similar or subset of the rights inviting member 104 has to deal with and/or override the situation of a conference member rejecting a joining member.

An alternative method of overriding the denial to a joining member involves bridging into the conference through a single overriding member. Specifically, a conference member may facilitate the joining member's entry to the conference by forwarding all communications to and from the conference to the joining member. Thus, if conference member 103 wishes to merge a joining member into the conference over the objection of other conference members, member 103 may do so by forwarding all conference communications to the joining member 105, and transmitting all communications from the joining member to the remainder of the conference members. Member 103 would have to have the appropriate clearance (e.g., password) to override the rejections given by one or more other members. Thus, through the use of passwords, certain members may be designated with override privileges.

During the joining process, the joining member 105 receives responses from each of the conference members, other than the inviting member 104. As these responses are received, the joining member 105 is admitted by various members of the conference. During the admissions process, an improved embodiment contemplates that the inviting member 104 would be periodically apprised of the status of the admission. Specifically, the inviting member may be apprised of each present conference member that admits the joining member 105 as that admission is sent from the conference member to the joining member. Alternatively, during the admissions process, until the joining member is fully admitted, periodic messages may be sent to inviting member 104 to advise the inviting member which members have admitted joining member 105. These status messages would ideally be sent from joining member 105 to the inviting member, wherein the last status message is a message indicating that full admission has been received from all members and the joining member has now joined.

Once joined, all future packets from other conference members are sent to member 105. Additionally, any future invite messages would include member 105, and member 105 can itself invite others to join the conference.

Split

Figure 2:
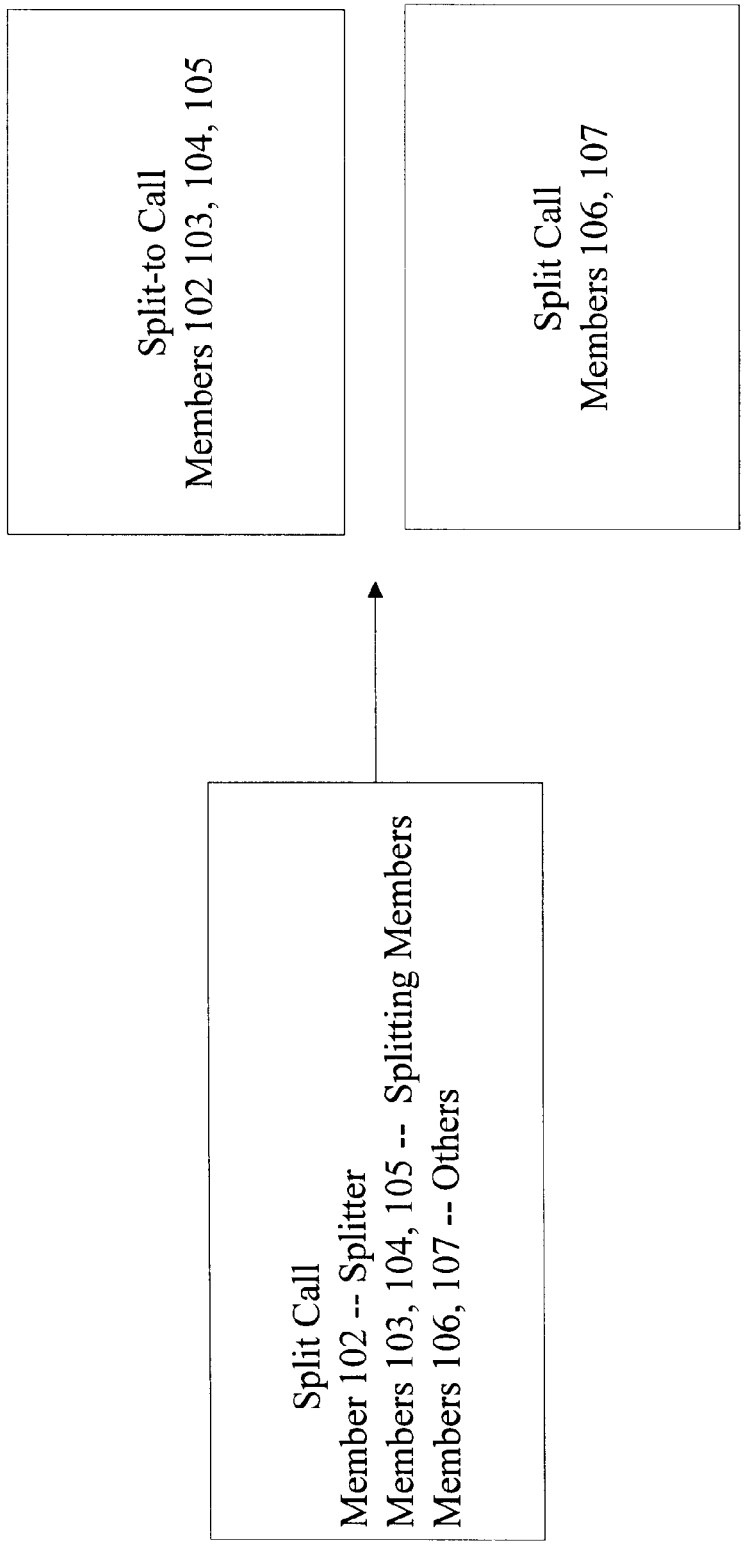
FIG. 2 is a high level conceptual diagram of a plurality of terminals splitting into two communications over the Internet.

Referring to FIG. 2, an alternative embodiment of the present invention includes a technique of splitting a conference into one or more disjoint conferences so members can, for example, focus on specific topics. In a preferred setting, this technique allows any member in the conference to initiate the split. For purposes of this disclosure, the initiating member will be denoted the "splitter"; members requested to split will be denoted "splitting members"; the "split call" will be the original call being split; and the "split-to call" is the newly formed call containing the splitter and splitting members.

After the split operation, the splitter and splitting members may leave the split call and the splitting members are a subset of the split call members. Each splitting member must be a member of the split call. In addition, each splitting member may accept or reject the split. Further, each splitting member knows who the other splitting members are. The splitting members that accept the split operation may leave or stay in the split call. The non-splitting members and the splitting members that reject the split operation stay in the split call. Finally, splitting (n−1) members from an n-way conference is viewed as a unanimous vote to expel the lone party.

Implementation of splitting is similar to an add-party request, as discussed above. A splitter 102 of the present conference wishes to setup a new call, which is essentially the same as adding multiple parties at the same time to a new call. The difference is that once the members accept the split, they will disconnect their connection with the existing split call.

Turning to a specific example of how a split takes place, consider the following setup. There is a 6 party conference with members 102, 103, 104, 105, 106, 107. This is the split call. Member 102 decides he wants to split into a split-to call with members 103, 104, 105, leaving members 106, 107 in the split call. For this example, let's say member 102, 103, 105 want to split and disconnect from the original split call. Member 104 wants to split but stay connected in the split call.

The signaling for this intent would look like the following:

Initially member 102 notifies members 103, 104, 105 of the intent to split in a message. The message includes information such as: an indication of the other splitting members contacted about the split-to call; an identifier for identifying the split-to call; and an optional leaving split call indication that the splitting member 103, 104, 105 should disconnect the existing split call leg with splitter 102. The optional indication is used only if splitter 102 wants to disconnect from the split call. If member 102 is willing to stay connected in the split call, member 102 won't include the optional indication. Finally, an operation identifier indicating this is a split operation may be provided. It should be recognized that each message discussed herein may include appropriate call identifiers for clarity, e.g., a split-to call identifier or split call identifier.

Next, splitting members 103, 104, 105 would receive the split invite and decide if they agree to the split, or if they want to stay connected with the existing split call, or both. Regardless of their decision, they must disconnect their split call leg with splitter 102 when splitter 102 indicates such with the optional indication.

Assuming all the splitting members wish to move into the split-to call. First, member 103 receives the invite and sends out a triggered invite to the others involved in the split operation, i.e., members 104, 105. The message preferably includes information: identifying the split-to call; identifying the splitter 102; identifying the other splitting members, i.e., 102, 105; an optional leaving split call indication telling whether splitting member 103 wants to disconnect from the original split call; and a general operation identifier.

Next, member 104 receives both the original split invite from splitter 102 and the triggered invite from member 103. Member 104 will accept member 103's request by sending an acceptance OK message. Member 104 will also attempt to contact member 105 in a message including: an invite; a split-to call identifier; a splitter 102 identifier; a list of other splitting members, i.e., 102, 103; and a general operation identifier. Because member 104 wants to stay connected in the split call, he will not include an optional leave split call indication in the triggered invite.

Finally, member 105 receives the original split invite from splitter 102 and both triggered invites from member 103 and member 104. Member 105 would respond to member 103 and member 104 and to the original request from splitter 102 with acceptance OK messages. Since splitter 102 and member 103 both requested to disconnect their split call legs, member 105 will tear down the media parameters for these legs. Member 104 did not request to disconnect from the split call, but member 105 wants to disconnect. To indicate this, member 105 will include an optional leave split call indication in the response to member 104 including a split call identifier.

Both member 103 and member 104 have received responses from everyone involved with the split operation so they may send acknowledgement (ACK) messages to each splitting member that decided to split to the split-to call, i.e., member 103 sends ACK to member 104, 105 and member 104 sends ACK to member 105. In addition, members 103, 104 also respond to splitter 102 with an acceptance OK message.

Now splitter 102 has received an "OK" response from each splitting member that accepted and successfully negotiated the new call parameters with other split call members 106, 107. The splitter 102 sends an acknowledgement (ACK) message to each splitting member 103–105 indicating the split-to call has been established. Everyone invited to split has successfully connected with the other splitting members. Those that wished to disconnect from the split call, i.e., members 102, 103 and 105, will send departing BYE messages to the other split call members, i.e., members 106, 107. Members 106, 107 send acceptance OK messages back to members 102, 103, 105.

This completes the split operation. The result is a new split-to call with members 102, 103, 104, 105 and the existing split call now contains members 104, 106, 107. Note member 104 is in both the split-to call and the split call since member 104 elected to stay in the split call upon accepting the split request.

In other cases, not all splitting members accept the operation.

In a first situation, some accept and some reject. Assuming the same situation as described above, i.e., splitter 102 wants to split off forming a split-to call with members 103, 104, 105, leaving the members 106, 107 in the split call. But, member 104 does not want to be part of this split operation. After member 102 sends the initial invite messages requesting the split the following messages are sent:

Member 103 accepts the split and tries to link up with the other members. Accordingly, member 103 sends a triggered invite to splitting members 104, 105 including information: identifying the split-to call; identifying the splitter 102; identifying the other splitting members, i.e., 102, 105; an optional leaving split call indication telling whether splitting member 103 wants to disconnect from the original split call; and a general operation identifier.

Member 104 rejects the split and responds with a reject split message to splitter 102 and member 103, which may include a split-to call identifier. Splitter 102 and member 103 respond with acknowledgement ACK messages, which may include a split-to call identifier.

Member 105 accepts the split by responding with an acceptance OK message to member 103, which may include a split-to call identifier. Member 105 also attempts to contact member 104 with an invite message including: a split-to call identifier; a splitter 102 identifier; a list of other splitting members, i.e., members 102, 103; an optional leave split call identification for member 105 if he wants to leave the split call; and a general operation identifier.

Member 104 sends a rejection message to the split invite from member 105. Member 105 responds with an acknowledgement ACK message to member 104 and an acceptance OK message to splitter 102.

Member 103 receives member 105's acceptance message allowing member 103 to complete the split sending a successful acceptance OK message to splitter 102.

Now member 102 sends acknowledgement (ACK) messages to everyone that accepted the split, i.e., members 103, 105. The splitting members that decided to split, i.e., members 102, 103, 105, would proceed in sending departing BYE messages to the rest of the split call members, i.e., 106, 107. Members 106, 107 send acknowledgement ACK messages to each split-to call member Since member 104 rejected, member 104 will not send departing BYE messages, but stays connected in the split call. The split call legs with member 104 have already been severed by the invites from members 102, 103, 105 to member 104. The result is the split-to call members 102, 103, 105 and the split call members 104, 106, 107.

In a second situation, all invited splitting members reject. In the above example, splitter 102 wishes to split with members 103, 104, 105. If they all reject the split and if splitter 102 decided to disconnect from the split call by including an optional leave split call identification in the invite, this would leave member 102 in a partially connected conference. Splitter 102 is connected in the split call with members 106, 107 but disconnected from members 103, 104, 105 as a result of the optional indication in the invite. To rectify this situation, splitter 102 must either re-establish links with members 103, 104, 105 or must disconnect with members 106, 107. If splitter 102 is unable to re-establish links with members 103, 104, 105, splitter 102 must leave the conference entirely. This leaves splitter 102 in an awkward position. If everyone declines the split operation, splitter 102 must be prepared to leave the conference entirely should he/she be rejected upon trying to seek re-admission to the conference.

If splitter 102 decided to stay connected with the split call by not including the optional indications, this situation would not happen. The splitting members would reject member 102's split invite and still have a split call leg active with member 102. To prevent the above situation, splitter 102 could always send a split invite without a leave split call indication. If one or more of the splitting members accepts, member 102 could change his/her mind at the end of the split operation and issue a departing BYE message to all the members connected on the split call.

A third situation arises when all splitting members want to split but for some reason cannot connect with everyone. For example, assume members 102, 103, 104, 105, 106, 107 are in a split call. Splitter 102 asks splitting members 103, 104, 105 to join him in the split-to call. Splitter 102 is cautious because of the situation where everyone rejects the split and does not include a leave split call indication in the original invite. Members 103, 104, 105 all wish to disconnect from the split call and only maintain split-to call legs.

Upon receipt of the split invite, member 103 sends triggered invites to member 104 and member 105, including: a splitter 102 identifier, a split-to call identifier; an list of other splitting members; an leave split call identification; and a general operation identifier. Members 104 and 105 send acceptance OK messages and member 103 sends an acceptance OK message to splitter 102.

Member 104 and member 105 must connect with each other to complete the split operation. Assume, for some reason, there is a failure response from member 105 to member 104's triggered invite.

At this point there is a partial conference formed with the split-to call. The following pairs of members are connected in the split-to call: members 102, 103; members 103, 104; members 103, 105. Members 102, 104 and member 102, 105 legs have not been established yet, i.e., because member 104 and member 105 haven't responded to member 102. Since member 105 failed to connect with one of the members, member 105 is obligated to back out of the split. Member 105 maintains whatever split call legs are active and stays in the split call. Since member 105 already responded to member 103 with success, member 105 must now send a departing message (BYE) to member 103 indicating the failure. Member 105 also responds to the original invite from splitter 102 with a failure response. Appropriate acceptance/acknowledgement messages will be returned to member 105 from member 103 and splitter 102.

Finally, to complete the split operation, member 103 and member 104 respond to the original invite with acceptance OK messages. Since both member 103 and member 104 want to disconnect from the split call, they also include a leave split call identification. Splitter 102 sends an acknowledgement ACK message to each member 103,104.

To finish the split transition, member 103 and member 104 must send departing messages (BYEs) to the other split call members, i.e., members 106, 107. Members 106, 107 may then send acknowledgement messages to members 103,104.

This completes the split operation. The split-to call contains members 102, 103, 104, and the split call contains members 102, 105, 106, 107.

Crossing Messages

Triggered invites between two signaling entities that are in the process of joining a multipoint conference may cross "on the wire." In accordance with alternative embodiment of the present invention, a simple implementation approach is provided for resolving the situation. The issue is a new flavor of an old problem that has in other contexts been referred to as "glare", "resource contention", or "collision."

A common approach to such problems is for the contending parties to abandon ("back off") their attempts to use the resource, and try again after a short delay. The delay should be random in order to keep the parties from simply repeating the colliding attempts some duration later. Variants of the back off technique are in use in numerous engineering contexts. The problem with approaches that rely upon backing off and retrying later is the introduction of additional latency. In many situations this additional latency can be ignored, particularly if the introduced delay can be made short enough or the incidence rate of such scenarios is sufficiently slight. Unfortunately, this is not the case when considering message collisions in multipoint conferences. While sufficiently improbable in ordinary scenarios, various conference services are implemented using algorithms that markedly increase the likelihood of crossing messages. Furthermore, since signaling across IP networks already involves significant latency, the introduced back off delay must itself be significant enough to ensure that the difference between the randomly selected member delays will generally exceed the time required to propagate the invites across the network. This means that the introduced delay will be measurable.

An alternative to random back offs in accordance with the invention, is for the members to share a mechanism for deciding which of the conflicting attempts will be successful and which should be abandoned. If there is a mechanism by which both members are certain to come the same conclusion, then back off can be avoided altogether. In the present invention, the technique involves prioritization of messages and prevention of collision by "deference" of one message to another. Successful application of deference techniques to the problem of resource contention requires that the contending parties share a common understanding of which of the two parties is expected to defer in any particular scenario.

While deference is easily applied to resolve resource contention when the relationship between two specific parties is known explicitly by both parties (e.g., verbal communication between a boss and employee), it is less apparent how to apply it when the parties were heretofore unknown to each other. Here, deference mechanisms depend upon the consistent application of a set of a deference algorithm or deference rules. The anachronistic adage "ladies first" is an example of this kind of technique, which is denoted herein as "algorithmic deference". Algorithmic deference assumes that there is a set of relevant observable data to which the deference algorithms may be applied. For example, the "ladies first" rule cannot be applied unless the gender of the contending parties is known.

Applying a deference algorithm to crossing messages requires crafting a rule-based deference algorithm that may be efficiently applied to the available data at each member with unambiguous result. For the crossing invite problem, the set of data available to any such rule(s) is rather tightly constrained, consisting of just the content carried within the invite messages themselves. Comparison of the members' IP addresses is insufficient because these addresses may be modified in transit (NAT), rendering the values used for comparison different at each member.

In accordance with the present invention, the uniform resource identifiers (URIs) passed in the "To" and "From" headers of the invite messages are used as the basis for comparison. The party whose URI is the lesser of the URIs, hereafter referred to as the "master," (as preferably evaluated by ordinary string comparison) must reply to the request from the other party, hereafter the "slave," with either a provisional "Pending Request" or "Colliding Request" response. Use of Colliding Request indicates that this request has been abandoned in favor of a request going the other way. Rather than immediately responding to the slave request with Colliding Request, it is permissible for the master to hold the slave request until it has been determined whether the slave accepted the master request. In this case, the slave should use the provisional Pending Request response to indicate the status of the slave request. This option allows the slave request to also be attempted in the event that the master request is not successful.

If it is known that a resource contention situation will develop, it may be possible to apply deference techniques proactively, thereby avoiding the development of contention altogether. However, while crossing messages may be expected to occur with some regularity in multipoint conferences, it may not be possible for a proactive application of deference to be applied. In this case, the slave in a signaling relationship continues to send out messages even when a crossing message is expected in order to ensure that signaling between the two members occurs as rapidly as possible.

Certain deference algorithms, including the one proposed herein, exhibit a predictable and continual preference for a particular party over another. Needless to say, such unequal access to resources is not always acceptable. In this case, the resource in contention is the opportunity to propose the types and formats of the media that will be used in communication between the contending members. While either party is unlikely to care which of the parties is cleared to make the communications proposal, it is possible to imagine scenarios where that would not be the case.

To deal with such situations, the algorithm can be modified to introduce a semirandom element into the equation. For example, perhaps a computation involving either the "Cseq" or "Call-Id" headers could cause the determination algorithm to flip-flop between preferring the lesser and greater URIs. Alternatively, a new message header could be introduced in which the parties would have the equivalent of a "rock-paper-scissors" battle, albeit with more conclusive results. For example, each member places a randomly generated number in a "Deference" header. If the sum of the numbers is odd, the request with the lower number is preferred, etc.

While the above describes the preferred embodiment of the invention, various modifications or additions will be apparent to those of skill in the art. Such modifications are intended to be covered by the claims pending hereto.

What is claimed is:

1. A method of splitting parties to a first conference implemented over a digital network into the first conference and a second conference, the first conference including a plurality of conference members, the second conference including a subset of the plurality of conference members, the method comprising:

transmitting a split invitation from a first conference member to a second conference member, the conference member receiving the split invitation being denoted a splitting member, the split invitation including information indicative of any other splitting member and whether the first conference member desires to leave the first conference;

in response to the split invitation, initiating a contact from the second conference member to any other splitting member indicated in the split invitation, the contact including information identifying the split invitation from the first conference member and whether the second conference member desires to leave the first conference;

transmitting a signal indicative of creation of the second conference from each splitting member that decides to accept the split invitation; and disconnecting from the first conference the split members that desire to leave the first conference.

2. The method of claim 1 wherein the step of transmitting a signal includes transmitting an approval response from each splitting member that accepts the invitation to every other splitting member that accepts the invitation.

3. The method of claim 2 wherein the step of transmitting a signal includes transmitting an acknowledgement in a response to the approval response.

4. The method of claim 2 wherein the step of transmitting a signal includes transmitting a departing message to each splitting member that does not accept the invitation and to each conference member that was not invited.

5. The method of claim 1 further comprising the step of transmitting a signal from each conference member that does not accept the invitation to each splitting member.

6. Digital conferencing apparatus for splitting a first conference taking place over a packet data network, said apparatus comprising:

means for receiving a split invitation from a first splitter member, the first splitter member being a member in the first conference, the split invitation specifying a set of other splitter members, the set of other splitter members being a subset of members of the first conference;

means for sending triggered invites from each of the other splitter members to each other, the triggered invites sent in response to the split invitation and including information identifying the split invitation from the first splitter member and whether the splitter member sending the invite desires to leave the first conference;

means for receiving messages from each of the splitter members indicating whether they accept the split invitation and whether they accept the triggered invites;

means for connecting the splitter members that have accepted the split invitation to a second conference; and means for disconnecting from the first conference the splitter members that desire to leave the first conference.

7. A method of splitting an ongoing conference taking place over a packet data network into a first and second conference comprising the steps of:

sending a split invitation over a packet switched network from a first conference member to a second conference member, the invitation specifying at least one other conference member;

sending messages between the second conference member and the at least one other conference member to establish parameters associated with the second conference and to decide whether to disconnect from the first conference;

sending messages between the first conference member and the other members specified in the split invitation to establish the second conference; and establishing the second conference between the conference members that accept the split invitation.

8. A method for preventing message collisions in a distributed multipoint conference comprising:

setting a deference algorithm;

applying the deference algorithm to prioritize messages between parties in the conference; and allowing a conferencing party with a prioritized message to reject a request for a colliding message in favor of the prioritized message.

9. The method of claim 8 wherein the deference algorithm prioritizes a message according to a uniform resource identifier of the message.

10. The method of claim 9 wherein the deference algorithm flips prioritization between types of uniform resource identifiers.

11. A method for preventing message collisions in a conference comprising:

establishing a deference algorithm, wherein the deference algorithm prioritizes a message based on a randomly generated number associated with the message; and applying the deference algorithm to prioritize messages between parties in the conference.

12. The method of claim 11 wherein the deference algorithm sums the randomly generated numbers of colliding messages and prioritizes the massages according to the sum.

* * * * *